(12) United States Patent
Ren et al.

(10) Patent No.: US 12,001,703 B2
(45) Date of Patent: Jun. 4, 2024

(54) DATA PROCESSING METHOD AND STORAGE DEVICE

(71) Applicant: HUAWEI TECHNOLOGIES CO., LTD., Guangdong (CN)

(72) Inventors: Ren Ren, Shanghai (CN); Zhongquan Liu, Shenzhen (CN); Hongwei Liu, Shanghai (CN); Fangfang Zhu, Xi'an (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 65 days.

(21) Appl. No.: 17/741,079

(22) Filed: May 10, 2022

(65) Prior Publication Data

US 2022/0269431 A1    Aug. 25, 2022

Related U.S. Application Data

(63) Continuation of application No. PCT/CN2020/136106, filed on Dec. 14, 2020.

(30) Foreign Application Priority Data

Jun. 11, 2020 (CN) .......................... 202010526840.7
Aug. 6, 2020 (CN) .......................... 202010784929.3

(51) Int. Cl.
*G06F 16/00* (2019.01)
*G06F 3/06* (2006.01)

(52) U.S. Cl.
CPC .......... *G06F 3/0641* (2013.01); *G06F 3/0604* (2013.01); *G06F 3/0608* (2013.01); *G06F 3/0674* (2013.01)

(58) Field of Classification Search
CPC .... G06F 3/0641; G06F 3/0604; G06F 3/0608; G06F 3/0674; G06F 16/1744; G06F 16/1752
See application file for complete search history.

(56) References Cited

U.S. PATENT DOCUMENTS

| 10,635,315 | B1 | 4/2020 | Armangau et al. |
| 11,435,921 | B2* | 9/2022 | Meiri .................... G06F 3/0656 |
| 2014/0095439 | A1 | 4/2014 | Ram |

(Continued)

FOREIGN PATENT DOCUMENTS

| CN | 103154950 A | 6/2013 |
| CN | 107506153 A | 12/2017 |

(Continued)

*Primary Examiner* — Paul Kim
(74) *Attorney, Agent, or Firm* — WOMBLE BOND DICKINSON (US) LLP

(57) ABSTRACT

This application provides a data processing method and a storage device, and belongs to the field of storage technologies. In this application, the storage device performs deduplication and compression based on different granularities, deduplicates data based on a large granularity, and compresses the data based on a small granularity. Therefore, a limitation that a deduplication granularity and a compression granularity need to be the same is removed. A deduplication ratio decrease caused by an excessively large granularity and a compression ratio decrease caused by an excessively small granularity are avoided to some extent, to improve an overall reduction ratio of deduplication and compression.

18 Claims, 8 Drawing Sheets

Indicate a data block or metadata with a smallest granularity

(56) References Cited

U.S. PATENT DOCUMENTS

2015/0347445 A1    12/2015  Zhu
2019/0114102 A1     4/2019  Chen
2020/0159698 A1     5/2020  Das
2022/0035546 A1*    2/2022  Park .................... G06F 3/0679

FOREIGN PATENT DOCUMENTS

CN      108427539 A    8/2018
CN      111124259 A    5/2020

* cited by examiner

DATA PROCESSING METHOD AND STORAGE DEVICE

CROSS-REFERENCE TO RELATED APPLICATIONS

This application is a continuation of International Application No. PCT/CN2020/136106, filed on Dec. 14, 2020, which claims priority to Chinese Patent Application No. 202010784929.3 filed on Aug. 6, 2020. This application claims priority to Chinese Patent Application No. 202010526840.7, filed on Jun. 11, 2020. All of which are hereby incorporated by reference in their entireties.

TECHNICAL FIELD

This application relates to the field of storage technologies, and in particular, to a data processing method and a storage device.

BACKGROUND

Deduplication and compression are key technologies in the storage industry. A storage device performs deduplication and compression, so that an amount of actually stored data can be reduced, storage space occupied by the data in the storage device can be reduced, and storage efficiency of the storage device can be improved.

Currently, a fixed granularity is preset for the storage device, and the storage device performs deduplication based on the granularity and performs compression based on the granularity. For example, the granularity is preset to 8 kilobytes (KB). When performing deduplication, the storage device determines whether each 8 KB data block is a duplicate block, and if an 8 KB data block is a duplicate block, the storage device deletes the 8 KB data block. In addition, when performing compression, the storage device compresses an 8 KB data block each time.

When data is processed according to the foregoing method, a deduplication granularity and a compression granularity need to be the same. It can be learned that the method has a severe limitation.

SUMMARY

Embodiments of this application provide a data processing method and a storage device, to overcome a limitation of a data processing method to some extent. The technical solutions are as follows.

According to a first aspect, a data processing method is provided. The method is performed by a storage device and includes: obtaining data; deduplicating the data based on a first granularity; compressing the data based on a second granularity, where a size of the second granularity is greater than a size of the first granularity; and storing data obtained after the deduplication and the compression in a hard disk of the storage device.

In an embodiment, the storage device performs deduplication and compression based on different granularities, performs the deduplication based on a large granularity, and performs the compression based on a small granularity. Therefore, a limitation that a deduplication granularity and a compression granularity need to be the same is removed. A deduplication ratio decrease caused by an excessively large granularity and a compression ratio decrease caused by an excessively small granularity are avoided to some extent, to improve an overall reduction ratio of deduplication and compression.

In an embodiment, the deduplication and the compression are not subject to a specific sequence in this application. In some scenarios, the compression may be performed before the deduplication. In some scenarios, the deduplication may be performed before the compression. For example, the deduplication is performed before the compression. After the deduplication is performed, a duplicate block and a non-duplicate block are obtained. In this application, only the non-duplicate block may be compressed. If the compression is performed before the deduplication, a compressed block is obtained after the data is compressed, and then the compressed block is deduplicated.

In an embodiment, the storage device stores metadata, and the metadata is managed based on a metadata management granularity, where a size of the metadata management granularity is less than or equal to a specified largest value and is greater than or equal to a specified smallest value, and the size of the first granularity is equal to an integer multiple of the smallest value.

In this manner, the smallest value of the metadata management granularity is used as the deduplication granularity. This helps obtain a relatively good deduplication granularity, and therefore improves a deduplication ratio and saves storage resources.

In an embodiment, the size of the second granularity is a product of the smallest value and a compression ratio.

In this manner, the compression granularity is no longer a fixed value, but is dynamically selected based on the compression ratio, so that a relatively good compression ratio is ensured when data read performance does not deteriorate.

In an embodiment, the deduplicating the data based on a first granularity includes: dividing the data into a plurality of data blocks; obtaining a fingerprint of each data block; and determining a duplicate block and a non-duplicate block from the plurality of data blocks based on the fingerprints.

In an embodiment, the compressing the data based on a second granularity includes: compressing the non-duplicate block based on the second granularity to obtain a compressed block, where the data obtained after the deduplication and the compression includes the compressed block.

In an embodiment, the method further includes: recording metadata of the compressed block.

In an embodiment, the recording metadata of the compressed block includes: if there are a plurality of compressed blocks and addresses of the plurality of compressed blocks are consecutive, recording one piece of metadata for the plurality of compressed blocks.

One piece of metadata is recorded for a plurality of compressed blocks with consecutive addresses, so that a quantity of pieces of recorded metadata is reduced, and storage resources occupied by the metadata in the storage device are reduced.

In an embodiment, the addresses of the plurality of compressed blocks being consecutive means that physical addresses of the plurality of compressed blocks are consecutive and logical addresses of the plurality of compressed blocks are consecutive.

In an embodiment, the piece of metadata includes an address of the first compressed block in the plurality of compressed blocks and a length of each compressed block.

Metadata is recorded in this manner, so that the data can be read by using the metadata, and further, a relatively good effect of compressing metadata space is achieved.

In an embodiment, the data is further compressed based on a third granularity before the deduplication and the compression, and a size of the third granularity is less than the size of the second granularity.

In this manner, when finding that an original compression granularity (the third granularity) of the compressed block is not a relatively good compression granularity (the second granularity), the storage device re-compresses the compressed block based on the relatively good compression granularity (the second granularity), so that a compression granularity of the compressed block is optimized. This helps improve the compression ratio.

In an embodiment, the storage device is a storage array.

In an embodiment, the storage device is a storage node in a distributed storage system.

In an embodiment, the first granularity is 4 KB, and the second granularity is 32 KB.

According to a second aspect, a data processing method is provided. The method is performed by a storage device and includes: obtaining data; determining a first granularity based on a metadata management granularity, where the metadata management granularity is a granularity used to manage metadata stored in the storage device, a size of the metadata management granularity is less than or equal to a specified largest value and is greater than or equal to a specified smallest value, and a size of the first granularity is equal to an integer multiple of the smallest value; deduplicating the data based on the first granularity; and storing data obtained after the deduplication in a hard disk of the storage device.

In an embodiment, the granularity used when the storage device performs the deduplication is determined based on the metadata management granularity, and the smallest value of the metadata management granularity is used as a deduplication granularity, to help obtain a relatively good granularity used for the deduplication. This improves a deduplication ratio and saves storage resources.

In an embodiment, the deduplicating the data based on the first granularity includes: dividing the data into a plurality of data blocks; obtaining a fingerprint of each data block; and determining a duplicate block and a non-duplicate block from the plurality of data blocks based on the fingerprints.

In an embodiment, the first granularity is 4 KB.

According to a third aspect, a data processing method is provided. The method is performed by a storage device and includes: obtaining data; determining a second granularity based on a metadata management granularity, where the metadata management granularity is a granularity used to manage metadata stored in the storage device, a size of the metadata management granularity is less than or equal to a specified largest value and is greater than or equal to a specified smallest value, and a size of the second granularity is a product of the smallest value and a specified compression ratio; compressing the data based on the second granularity; and storing data obtained after the compression in a hard disk of the storage device.

In the method provided in the third aspect, the granularity used when the storage device performs the compression is no longer a fixed value but is dynamically determined based on the metadata management granularity and the compression ratio, so that a relatively good compression ratio is ensured when data read performance does not deteriorate.

In an embodiment, the size of the second granularity is a product of the smallest value and the compression ratio.

In an embodiment, the compressing the data based on the second granularity includes:

compressing a non-duplicate block based on the second granularity to obtain a compressed block, where the data obtained after the deduplication and the compression includes the compressed block.

In an embodiment, the method further includes: recording metadata of the compressed block.

In an embodiment, the recording metadata of the compressed block includes:

if there are a plurality of compressed blocks and addresses of the plurality of compressed blocks are consecutive, recording one piece of metadata for the plurality of compressed blocks.

In an embodiment, the piece of metadata includes an address of the first compressed block in the plurality of compressed blocks and a length of each compressed block.

In an embodiment, the data is further compressed based on a third granularity before the deduplication and the compression, and a size of the third granularity is less than the size of the second granularity.

In an embodiment, the method further includes: storing a fingerprint of a duplicate block.

In an embodiment, the method further includes: recording metadata of the non-duplicate block, and storing a fingerprint of the non-duplicate block in a fingerprint table.

In an embodiment, the second granularity is 32 KB.

According to a fourth aspect, a storage device is provided. The storage device includes at least one processor and a hard disk, and the at least one processor is configured to execute instructions, so that the storage device performs the data processing method provided in at least one of the first aspect, any optional manner of the first aspect, the second aspect, any optional manner of the second aspect, the third aspect, and any optional manner of the third aspect. The hard disk is configured to store data. For specific details of the storage device provided in the fourth aspect, refer to at least one of the first aspect, any optional manner of the first aspect, the second aspect, any optional manner of the second aspect, the third aspect, and any optional manner of the third aspect. Details are not described herein again.

In some embodiments, the at least one processor includes a first processor, a second processor, and a third processor.

The first processor is configured to obtain data.

The second processor is configured to deduplicate the data based on a first granularity.

The third processor is configured to compress the data based on a second granularity, where a size of the second granularity is greater than a size of the first granularity.

The first processor is further configured to store data obtained after the deduplication and the compression in the hard disk.

According to a fifth aspect, a storage device is provided. The storage device includes a function of implementing data processing in at least one of the first aspect, any optional manner of the first aspect, the second aspect, any optional manner of the second aspect, the third aspect, and any optional manner of the third aspect. The storage device includes at least one module, and the at least one module is configured to implement the data processing method provided in at least one of the first aspect, any optional manner of the first aspect, the second aspect, any optional manner of the second aspect, the third aspect, and any optional manner of the third aspect.

In some embodiments, the module in the storage device is implemented by using software, and the module in the storage device is a program module. In some other embodiments, the module in the storage device is implemented by using hardware or firmware. For specific details of the storage device provided in the fifth aspect, refer to the first aspect, any optional manner of the first aspect, the second aspect, any optional manner of the second aspect, the third aspect, or any optional manner of the third aspect. Details are not described herein again.

According to a sixth aspect, a computer-readable storage medium is provided. The storage medium stores at least one instruction, and the instruction is read by a processor, so that a storage device performs the data processing method provided in at least one of the first aspect, any optional manner of the first aspect, the second aspect, any optional manner of the second aspect, the third aspect, and any optional manner of the third aspect.

According to a seventh aspect, a computer program product is provided. The computer program product includes computer instructions, and the computer instructions are stored in a computer-readable storage medium. A processor of a storage device reads the computer instructions from the computer-readable storage medium, and the processor executes the computer instructions, so that the storage device performs the data processing method provided in at least one of the first aspect, any optional manner of the first aspect, the second aspect, any optional manner of the second aspect, the third aspect, and any optional manner of the third aspect.

According to an eighth aspect, a chip is provided. When the chip is run on a storage device, the storage device is enabled to perform the data processing method provided in at least one of the first aspect, any optional manner of the first aspect, the second aspect, any optional manner of the second aspect, the third aspect, and any optional manner of the third aspect.

DESCRIPTION OF EMBODIMENTS

Figure 1:
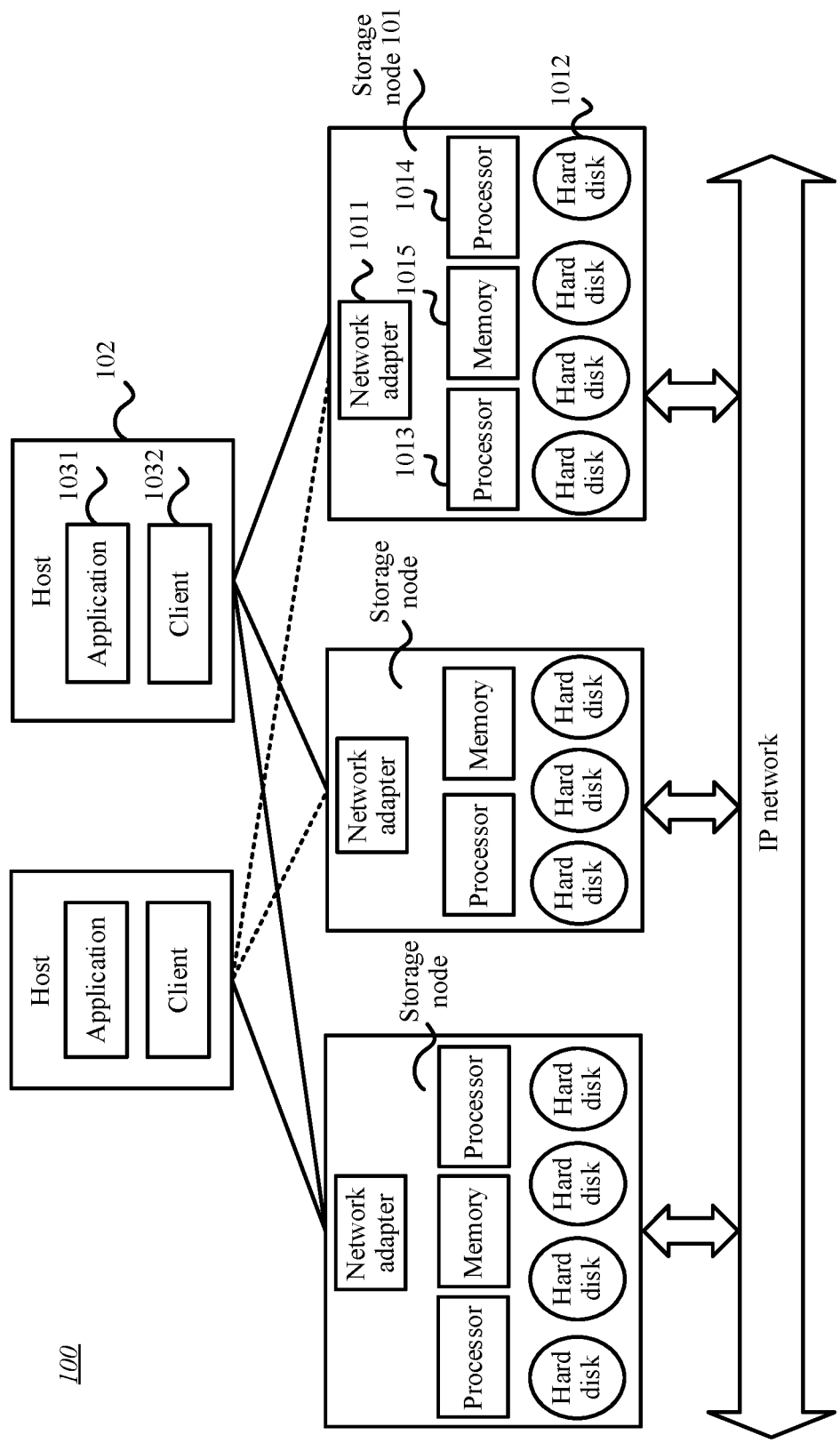
FIG. 1 is a schematic diagram of a system architecture of a distributed storage system according to an embodiment of this application.

To make objectives, technical solutions, and advantages of this application clearer, the following further describes implementations of this application in detail with reference to accompanying drawings.

The embodiments of this application relate to application of deduplication and compression technologies. For ease of understanding, the following first describes related concepts such as terms related to the deduplication and compression technologies in the embodiments of this application.

(1) Deduplication (Deduplicate)

The deduplication is a short term of duplicate data deletion and is a data reduction technology. A large amount of duplicate data is stored in a storage system, and occupies large space of a hard disk. A deduplication technology can be used to delete the duplicate data and only one copy of same data is stored. This saves data storage space. A technical principle of the deduplication includes: block partitioning is first performed. That is, to-be-written data is divided into a plurality of data blocks. Then, fingerprint calculation is performed. That is, a fingerprint of each data block obtained after the division is calculated based on the data block. Then, fingerprint searching is performed. That is, the fingerprint is used as an index, to perform searching and comparison in a fingerprint table. If a same fingerprint exists in the fingerprint table, it indicates that the data block is a duplicate block. In this case, the data block is not stored, but a fingerprint index of the data block is stored. If a same fingerprint does not exist the fingerprint table, it indicates that the data block is a non-duplicate block (also referred to as a unique block), the data block is stored and metadata of the data block is created. Based on different execution occasions, deduplication is classified into inline deduplication and post-process deduplication, which are described in (2) and (3). Based on different duplicate check modes, deduplication is classified into fixed-length deduplication and similarity-based deduplication, which are described in (4) and (5).

(2) Inline Deduplication

The inline deduplication means deduplication on data before the data is written to a hard disk. The inline deduplication is also referred to as pre-process deduplication.

(3) Post-Process Deduplication

The post-process deduplication means deduplication on data after the data is written to a hard disk. The post-process deduplication is also referred to as offline deduplication. The post-process deduplication may be implemented in a plurality of manners. In some embodiments, after the data is written to the hard disk, data is read from the hard disk to a buffer. Fingerprint calculation is performed on the data in the buffer, and duplicate data is determined by comparing whether fingerprints are the same. If duplicate data is found, deduplication is performed and data obtained after the deduplication is written to the hard disk again. In some embodiments, when to-be-stored data is obtained, a fingerprint of the data is calculated, the data is written to the hard disk, and the fingerprint is stored in an opportunity table. When deduplication is to be performed, fingerprints are read from the opportunity table, and different fingerprints are compared to determine duplicate data. If duplicate data is found, deduplication is performed.

(4) Fixed-Length Deduplication

When the fixed-length deduplication is used, different data blocks need to be completely the same, so that a data block can be used as a duplicate block for deduplication. In addition, data is divided based on a preset granularity during block partitioning, and the data is aligned based on the granularity during fingerprint searching.

(5) Similarity-Based Deduplication

When the similarity-based deduplication is used, data blocks do not need to completely match. If two data blocks are similar, a data block is determined as a duplicate block. In addition, data is also divided based on a preset granularity during block partitioning.

(6) Fingerprint (FP)

A fingerprint is an essential feature of a data block. The data block tends to be large. Therefore, a goal of a fingerprint is to distinguish different data blocks in smaller data representations (for example, 16, 32, 64, 128 bytes). In some embodiments, a fingerprint of a data block is calculated according to a hash algorithm, and the fingerprint of the data block is a hash value of a database. Ideally, each data block has a unique fingerprint and different data blocks have different fingerprints. Certainly, in a case of a hash collision, different data blocks may also have a same fingerprint.

(7) Compression

The compression is a byte-level data reduction technology. A concept of the compression is to use an encoding technology to represent longer data in a shorter encoded format to reduce a data size.

(8) Compression Ratio

The compression ratio is a positive integer greater than or equal to 1. The compression ratio indicates a ratio of an amount of data that is not compressed to an amount of data that is compressed. For example, if 32 KB data is compressed to 8 KB, a compression ratio is 4:1.

(9) Deduplication and Compression

The deduplication and compression is a reduction technology in which deduplication and compression are performed together. When a deduplication and compression solution is used, after duplicate blocks and non-duplicate blocks are found, a plurality of non-duplicate blocks are first compressed, and compressed blocks are stored. When data is read, a compressed block is decompressed. Because the non-duplicate blocks are compressed, a data reduction effect is a combination of a deduplication effect and a compression effect, and more data is reduced.

(10) Read Amplification

The read amplification is a case in which a granularity of data actually read from a hard disk is greater than a granularity of data corresponding to a read request. The read amplification consumes network bandwidth resources and affects data read performance. For example, a granularity of data stored in a hard disk is 8 KB. A storage device receives a read request, where the read request indicates the storage device to read 4 KB data. The storage device reads, from the hard disk, an 8 KB data block in which the 4 KB data is located, determines, from the 8 KB data block, the 4 KB data that the read request requests to read, and returns the 4 KB data to an initiator of the read request. In this example, the data granularity corresponding to the read request is 4 KB, but the granularity of actually read data is 8 KB. Because extra 4 KB data is read, bandwidth resources are excessively occupied and data read performance is affected.

(11) Fingerprint Index (FPI)

A fingerprint index is an index of a fingerprint of a data block. The fingerprint index is used to query the corresponding fingerprint. For brevity, in the embodiments of this application, a specific FPI is subsequently represented by using a form "$FPI_{number}$" without introducing an understanding difficulty. The number indicates an identifier of a corresponding data block. For example, $FPI_4$ indicates a fingerprint index of a data block 4.

(12) Storage Unit

A storage unit is a minimum unit for a storage operation in a storage device, and the storage operation includes a data write operation or a data read/write operation. For example, a storage unit is a sector of the storage device.

(13) Physical Address

A physical address is an actual address at which data is stored in a hard disk. Specifically, Each Region on the Hard Disk is Determined by a Head, a Cylinder (that is, a Track), and a sector on which the region is located. The physical address includes three parameters: a head parameter, a cylinder parameter, and a sector parameter. The head parameter is used to identify a head in which the data is located. The cylinder parameter is used to identify a cylinder in which data is located. The sector parameter is used to identify a sector in which data is located. The physical address of the data can indicate a head that the hard disk should use to read the data and a specific sector on a specific cylinder that the data should be read from.

(14) Logical Address

The logical address is different from the physical address. A full name of the logical address is a logical block address (LBA). The LBA is used as an address of data, so that three-dimensional addressing based on a head, a cylinder, and a sector is changed to one-dimensional linear addressing, thus improving addressing efficiency.

The logical address is an address of logical space presented by a storage device to a host. When sending a write request or a read request to the storage device, the host uses the write request or the read request to carry the logical address. When receiving the write request or the read request, the storage device obtains the logical address carried in the write request or the read request, performs address translation one or more times on the logical address to determine a physical address, and writes data to or reads data from the physical address.

Logical addresses are consecutive. For example, LBAs are consecutive. For example, an LBA of a data block 1 is 201, an LBA of a data block 2 is 202, and an LBA of a data block 3 is 203. This may be described as: Logical addresses of the data block 1, the data block 2, and the data block 3 are consecutive.

(15) Metadata

The metadata is data that describes properties of service data. For example, the metadata describes a fingerprint, a logical address, a physical address, a mapping relationship between a logical address and a physical address, and a mapping relationship between a fingerprint and a logical address. The metadata is stored differently from the service data. The metadata is usually stored in a specific data structure. The data structure for storing the metadata is, for example, a binary tree or a B+ tree. In these data structures, metadata is managed at a specific granularity. In some embodiments of this application, a granularity for managing metadata is referred to as a metadata management granularity.

(16) Fingerprint Table

The fingerprint table is used to store a fingerprint of each data block stored in a storage device.

(17) Opportunity Table

The opportunity table is used to store fingerprints of data blocks written to a storage device within a recent period of time. The opportunity table is different from the fingerprint table. The opportunity table may be understood as a temporary window, used to search for a data block with a deduplication opportunity. Specifically, the storage device stores fingerprints of data blocks generated within a recent period of time in the opportunity table. When a deduplication trigger condition is met (for example, a load is lower than a threshold), the storage device finds a duplicate block based on the fingerprints in the opportunity table, deduplicates the duplicate block, and then stores a fingerprint of the duplicate block in the fingerprint table.

Application scenarios provided in the embodiments of this application are described below.

The method provided in the embodiments can be used in a distributed storage system or a centralized storage device. The following separately describes the two application scenarios.

Application Scenario 1: Distributed Storage System

Refer to FIG. 1. The embodiments provide a distributed storage system 100. As shown in FIG. 1, the system 100 includes a plurality of storage nodes 101 and at least one host 102. A communications connection is established between each host 102 and the storage node 101 through a wired or wireless network. For example, as shown in FIG. 1, a communications connection is established between each host 102 and the storage node 101 through an Internet Protocol (IP) network or another network.

Each storage node 101 includes a network adapter 1011, one or more hard disks 1012, a processor 1013, a processor 1014, and a memory 1015.

The network adapter 1011 is also referred to as a network interface card (NIC). The network adapter 1011 is configured to communicate with the host 102.

The hard disk 1012 is, for example, a solid state drive (SSD) or a hard disk drive (HDD).

A location relationship between the storage node 101 and the hard disk 1012 is not limited in the embodiments. In some embodiments, as shown in FIG. 1, the hard disk 1012 is located inside the storage node 101. For example, the storage node 101 is a server, and a plurality of hard disks are disposed in the server. In some other embodiments, the hard disk 1012 is not inside the storage node 101, but is located in a disk enclosure coupled to the storage node 101. The disk enclosure includes a plurality of hard disks 1012.

The processor 1013 is, for example, a central processing unit (CPU). For example, there are one or more processors 1013.

The processor 1014 is configured to undertake a function of compression and/or deduplication, to reduce a computing load of the processor 1013. In some embodiments, the processor 1014 is a processor having a same physical form as the processor 1013. In some embodiments, the processor 1014 is a processor having a physical form different from that of the processor 1013. Optionally, the processor 1014 is a processing chip having a computing capability. For example, the processor 1014 may be an acceleration card, a coprocessor, a graphics processing unit (GPU), or a neural-network processing unit (NPU). For example, there are one or more processors 1014.

When the storage node 101 includes both the processor 1014 and the processor 1013, the processor 1014 and the processor 1013 may optionally cooperate to complete data processing. For example, the processor 1013 is configured to receive data from the host, send the data to the processor 1014, and indicate the processor 1014 to compress and/or deduplicate the data. The processor 1014 is triggered by an instruction received from the processor 1013 to perform compression and/or deduplication.

In some embodiments, when the storage node 101 has a plurality of processors 1014, the processor 1013 is configured to schedule the plurality of processors 1014. For example, the processor 1013 divides a compression task and/or a deduplication task into a plurality of subtasks, and allocates each subtask to a corresponding processor 1014.

In some embodiments, the storage node 101 further includes a communications bus (not shown in FIG. 1). For example, both the processor 1014 and the processor 1013 access the memory 1015 through the communications bus, to obtain instructions or code buffered in the memory 1015.

It should be noted that the processor 1014 is an optional component of the storage node 101. In other embodiments, the storage node 101 includes the processor 1013 and does not include the processor 1014. For example, the processor 1013 independently completes operations of obtaining data and compressing and/or deduplicating the data.

The host 102 includes an application 1031 and a client 1032.

The storage node 101 can provide a data storage service for the host 102. For example, when the host 102 is to store data in the storage node 101, the application 1031 (also referred to as an upper-layer application) on the host 102 generates a write request, and sends the write request to the storage node 101. The storage node receives the write request by using the network adapter 1011, writes, to the hard disk 1012, data indicated by the write request, and stores metadata of the data.

The storage node 101 can provide a data access service for the host 102. For example, when the host 102 is to access data stored in the storage node 101, the application 1031 on the host 102 generates a read request, and sends the read request to the storage node 101. The storage node receives the read request by using the network adapter 1011. The storage node determines an address of data in the hard disk 1012 based on the data indicated by the read request and stored metadata, reads the data from the corresponding address in the hard disk 1012, and sends the data to the host 102 by using the network adapter 1011. The host 102 receives the data, to obtain the data stored by the storage node 101.

Application Scenario 2: Centralized Storage Device

The centralized storage device is, for example, a storage array. The storage array includes one or more hard disks and one or more controllers, also referred to as storage controllers. Alternatively, the centralized storage device may be a storage node, such as the storage node 101 shown in FIG. 1. A controller in the storage device is also referred to as a storage controller. The centralized storage device is connected to a host through a wired or wireless network.

In the application scenarios described above, with an explosive growth of data, data storage requirements of the host are increasing, and data occupies more space in a storage system. In order to alleviate a problem caused by a space growth in the storage system, deduplication and compression technologies have become a hot research topic in this field. Deduplication and compression can reduce an amount of data, to effectively reduce overheads of the storage system.

In a current deduplication and compression solution, because a metadata management granularity is fixed, granularities used for compression and deduplication are also consistent.

However, it is found through researches that when granularities used for deduplication and compression are the same, if the granularity is excessively large, a compression ratio increases and a deduplication ratio decreases, and if the granularity is excessively small, the deduplication ratio increases and the compression ratio decreases. Therefore, if granularities used for deduplication and compression are the same, either the deduplication ratio or the compression ratio decreases. The deduplication ratio and the compression ratio cannot be both relatively good.

In view of this, in the embodiments of this application, the storage device uses different granularities for deduplication and compression. That is, a deduplication granularity and a compression granularity are different, to avoid a deduplication ratio decrease caused by an excessively large granularity and a compression ratio decrease caused by an excessively small granularity. The following describes several granularities described in this application and a relationship between different granularities by using (a) to (g).

(a) Granularity Granularity

The granularity is also referred to as a size of data, an amount of data, or a length of data. A larger granularity indicates a larger size of data. Units of the granularity include but are not limited to KB, megabyte (MB), and the like. For example, if a granularity is 4 KB, it means that a size of one piece of data is 4 KB. The granularity is an important parameter for a storage device. The granularity affects many services of the storage device, including but not limited to data read, data storage, deduplication, compression, metadata management, and the like. In some embodiments of this application, granularities, a relationship between different granularities, and an impact of a granularity on the storage device described in services such as deduplication, compression, and metadata management are mainly described.

(b) Deduplication Granularity

The deduplication granularity is used to indicate a granularity used when a storage device queries duplicate data. The deduplication granularity is equal to a granularity of a block in a deduplication process. For example, when a size of a deduplication granularity is 4 KB, the storage device divides data into a plurality of 4 KB data blocks. The storage device determines whether each 4 KB data block is a duplicate block. If a 4 KB data block is a duplicate block, the storage device deletes the 4 KB data block. In some embodiments, if deduplication is performed in a fixed-length deduplication mode, a size of a deduplication granularity is 4 KB. If similarity-based deduplication is used, a deduplication granularity is 8 KB.

(c) Compression Granularity

The compression granularity is used to indicate a granularity used when a storage device performs data compression. The storage device determines, based on the compression granularity, a size of data to be compressed at a time. For example, when a size of a compression granularity is 32 KB, the storage device compresses 32 KB data. The size of the compression granularity affects a compression ratio. It is experimentally found that the compression ratio is directly proportional to the size of the compression granularity. When the size of the compression granularity is less than 32 KB, a larger size of the compression granularity indicates a larger compression ratio. When the size of the compression granularity exceeds 32 KB, the compression ratio tends to be stable. In some embodiments, the size of the compression granularity is determined based on the compression ratio. In some embodiments, the size of the compression granularity is set to 32 KB.

(d) Metadata Management Granularity

The metadata management granularity is used to indicate a granularity of metadata recorded by a storage device. For example, in some embodiments, a value of the metadata management granularity is not a fixed value, but can dynamically change within a specific range. Specifically, the metadata management granularity is an interval. This interval has a smallest value and a largest value. The granularity of the metadata recorded by the storage device is, for example, the smallest value of the interval, the largest value of the interval, or a value between the smallest value and the largest value. For example, if a size of the metadata management granularity is [4 KB, 1 M], the storage device may optionally record a piece of 4 KB metadata, or record a piece of 1 M metadata, or record a piece of metadata with a granularity between 4 KB and 1 M.

In some embodiments, the size of the metadata management granularity is an integer multiple of a size of a storage unit. For example, the metadata is stored by using at least one storage unit. A quantity relationship between the metadata and the storage unit is a one-to-one relationship or a one-to-many relationship. When the quantity relationship between the metadata and the storage unit is the one-to-one relationship, one storage unit stores one piece of metadata. When the quantity relationship between the metadata and the storage units is the one-to-many relationship, a plurality of storage units jointly store one piece of metadata. For example, a plurality of storage units with consecutive physical addresses and consecutive logical addresses jointly store one piece of metadata. When the metadata is stored in this manner, a smallest value of the size of the metadata management granularity is the size of the storage unit.

Figure 2:
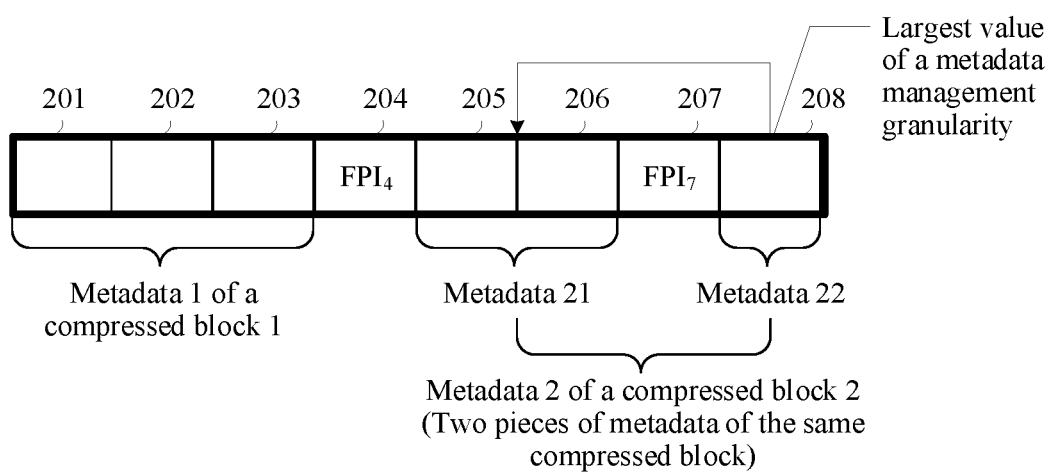
FIG. 2 is a schematic diagram of metadata storage according to an embodiment of this application.

For example, FIG. 2 shows eight storage units in the storage device. The eight storage units are a storage unit 201, a storage unit 202, a storage unit 203, a storage unit 204, a storage unit 205, a storage unit 206, a storage unit 207, and a storage unit 208. A smallest value of the size of the metadata management granularity is a size of one of the eight storage units, and is represented by one grid in FIG. 2. A largest value of the size of the metadata management granularity is a sum of sizes of the eight storage units, and is represented by eight grids in FIG. 2.

(e) Relationship Between a Deduplication Granularity and a Compression Granularity In some embodiments, a size of the deduplication granularity is inversely proportional to a size of the compression granularity. The size of the deduplication granularity is smaller than the size of the compression granularity. For example, the size of the deduplication granularity is 4 KB, and the size of the compression granularity is 32 KB. A smaller deduplication granularity helps improve a deduplication ratio, and a larger compression ratio helps improve a compression ratio. Therefore, a storage device uses a large-granularity compression and small-granularity deduplication solution, to improve both the deduplication ratio and the compression ratio, and achieve a relatively good overall reduction ratio.

In some embodiments, both the deduplication granularity and the compression granularity are determined based on the metadata management granularity. For details, refer to the following (f) and (g). The storage device separately selects a deduplication granularity and a compression granularity based on the metadata management granularity, so that both deduplication and compression are performed based on their respective relatively good granularities, and both the deduplication ratio and the compression ratio can be relatively good.

(f) Relationship Between a Deduplication Granularity and a Metadata Management Granularity In some embodiments, the deduplication granularity is determined based on the metadata management granularity. In some embodiments, a size of the deduplication granularity is equal to a smallest value of a size of the metadata management granularity. For example, when the metadata management granularity is [4 KB, 1 M], the size of the deduplication granularity is equal to 4 KB. For example, when the metadata management granularity is [8 KB, 2 M], the size of the deduplication granularity is equal to 8 KB. When the smallest value of the metadata management granularity is a size of one storage unit, the size of the deduplication granularity is, for example, the size of the one storage unit. For example, as shown in FIG. 2, the size of the deduplication granularity is a size of the storage unit 201.

The smallest value of the metadata management granularity is used as the deduplication granularity. This helps obtain a relatively good deduplication granularity, to improve a deduplication ratio and save storage resources. The following describes the technical principle of this technical effect.

The deduplication granularity affects the deduplication ratio. If the deduplication granularity is excessively large, the deduplication ratio decreases. For example, if the deduplication granularity is 32 KB, the storage device uses 32 KB data as a duplicate block and deletes the 32 KB data only when all the 32 KB data is duplicate data. If only some of the 32 KB data is duplicate data, for example, if only 24 KB data is duplicate data and the other 8 KB data is not duplicate data, the storage device does not perform deduplication. It can be learned from this example that an excessively large deduplication granularity leads to a poor deduplication effect.

In addition, the deduplication granularity affects metadata storage overheads. The storage device records one piece of metadata for each duplicate block. A smaller deduplication granularity indicates more metadata recorded by the storage device. Therefore, if the deduplication granularity is excessively small, excessive duplicate blocks are generated, and the storage device is to record excessive metadata. As a result, the metadata occupies excessive storage resources.

However, in the embodiments, the smallest value of the metadata management granularity is used as the deduplication granularity. The deduplication granularity is small enough, and this helps improve the deduplication ratio. In addition, during deduplication, the storage device is not to record metadata for data with a size less than the smallest value of the metadata management granularity. Therefore, a resource waste caused by recording excessive metadata is avoided.

In some other embodiments, the size of the deduplication granularity is not the smallest value of the metadata management granularity, but is an integer multiple of the smallest value of the metadata management granularity. For example, when the metadata management granularity is [4 KB, 1 M], the size of the deduplication granularity is any multiple of 4 KB between 4 KB and 1 M. For example, the size of the deduplication granularity is two or three times the smallest value of the metadata management granularity. When the smallest value of the metadata management granularity is a size of one storage unit, the size of the deduplication granularity is, for example, an integer multiple of the size of the one storage unit. For example, as shown in FIG. 2, the size of the deduplication granularity is an integer multiple of a size of the storage unit 201.

(g) Relationship Between a Compression Granularity and a Metadata Management Granularity In some embodiments, the compression granularity is determined based on the metadata management granularity. In some embodiments, the compression granularity is determined based on both the metadata management granularity and a compression ratio. In some embodiments, the compression granularity is determined based on a smallest value of the metadata management granularity and a compression ratio. For example, a size of the compression granularity is a product of the smallest value of the metadata management granularity and the compression ratio. For example, if the compression ratio is N:1, the size of the compression granularity is N times the smallest value of the metadata management granularity, where N is a positive integer. For example, when the metadata management granularity is [8 KB, 2 M] and the compression ratio is 4:1, the size of the compression granularity is 8 KB×4=32 KB.

When the smallest value of the metadata management granularity is a size of one storage unit, the size of the compression granularity is, for example, a product of the size of the one storage unit and the compression ratio. For example, as shown in FIG. 2, the compression granularity is, for example, a product of a size of the storage unit 201 and the compression ratio. For example, when the compression ratio is 4:1, the compression granularity is four times the size of the storage unit 201, and the compression granularity corresponds to four grids in FIG. 2. The compression granularity is no longer a fixed value, but is dynamically selected based on the compression ratio, so that a relatively good compression ratio is ensured when data read performance does not deteriorate.

The features of various granularities and granularity relationships described above are, for example, used in a process of writing data by the storage device. The data write procedure includes an inline deduplication procedure and a post-process deduplication procedure. The following uses the method 300 as an example to describe how the storage device performs inline deduplication by using the various granularities described above, and uses the method 400 as an example to describe how the storage device performs post-process deduplication by using the various granularities described above.

The method 300 and the method 400 described below are performed by the storage device.

In some embodiments, the method 300 or the method 400 is used in a distributed storage system, and the storage device that performs the method 300 or the method 400 is one or more storage nodes in the distributed storage system. For example, the storage device that performs the method 300 or the method 400 is the storage node 101 in the system 100 shown in FIG. 1, and data processed by the method 300 or the method 400 is data on the host 102 in the system 100.

In some other embodiments, the method 300 or the method 400 is used in a centralized storage device, and the storage device that performs the method 300 or the method 400 is a storage array.

In some embodiments, the method 300 or the method 400 is performed by a CPU. In some other embodiments, the method 300 or the method 400 is performed by a CPU in collaboration with a dedicated processor for deduplication and compression, and the dedicated processor for deduplication and compression is, for example, a hardware accelerator card. For example, the CPU is the processor 1013 shown in FIG. 1, and the dedicated processor is the processor 1014 shown in FIG. 1. Specifically, a deduplication and compression procedure includes tasks such as data blocking, fingerprint calculation, fingerprint search, data compression, and data storage. For example, the dedicated processor executes the fingerprint calculation task and the data compression task, and the CPU executes another task in the deduplication and compression procedure, so that the fingerprint calculation task and the data compression task are offloaded from the CPU to the dedicated processor, to reduce CPU computing resources occupied by deduplication and compression, and accelerate the deduplication and compression procedure.

It should be noted that, for content in the method 400 similar to that in the method 300, refer to the method 300. Details are not described in the method 400.

Figure 3:
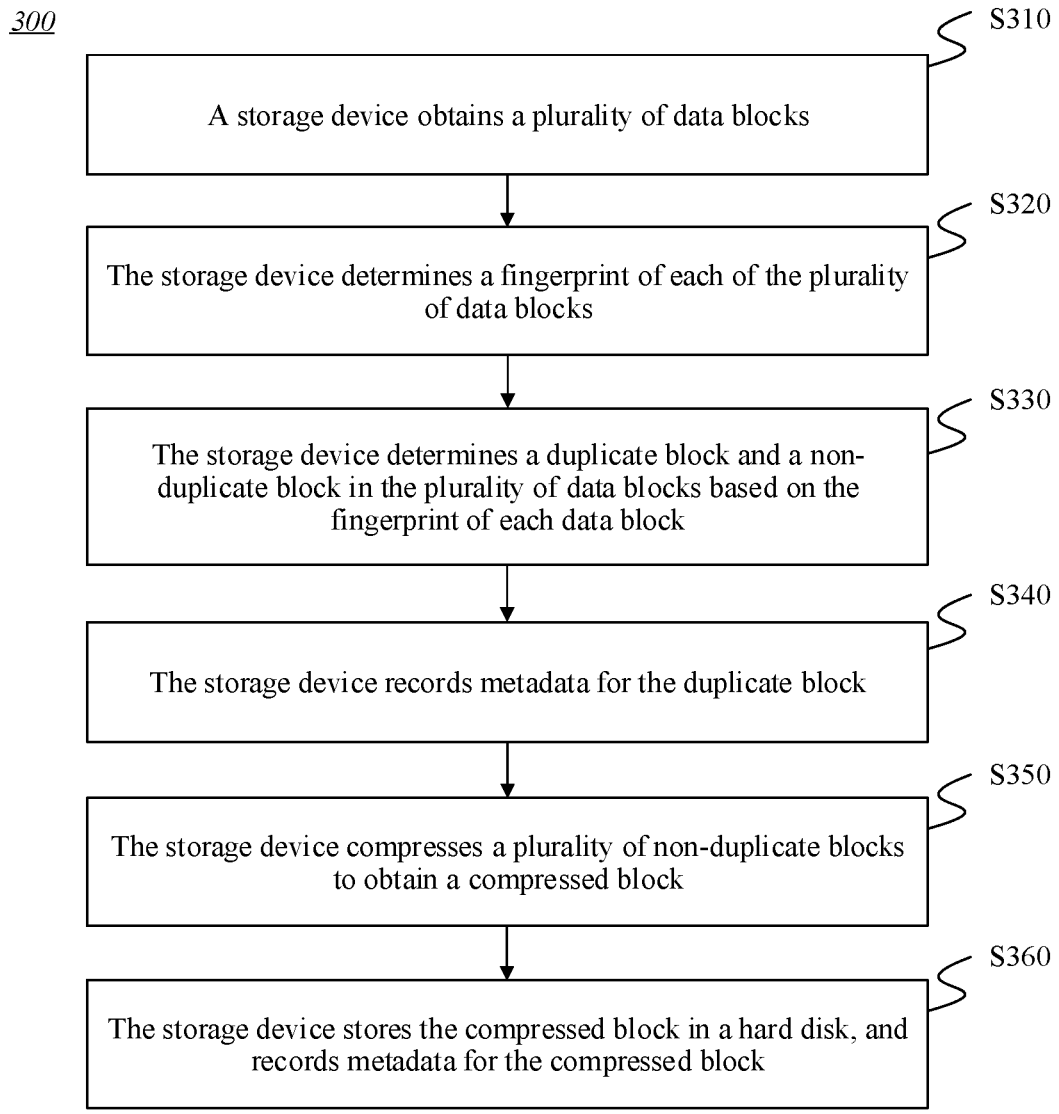
FIG. 3 is a flowchart of a data processing method according to an embodiment of this application.

FIG. 3 is a flowchart of a data processing method 300 according to an embodiment of this application.

For example, the method 300 includes S310 to S360.

S310: A storage device obtains a plurality of data blocks.

In some embodiments, S310 includes operation S311 to operation S313.

S311: The storage device receives a write request from a host.

The write request is used to request the storage device to store data, and the write request includes to-be-stored data and a logical address of the data.

S312: The storage device obtains the data from the write request.

S313: The storage device divides the data based on a first granularity to obtain the plurality of data blocks, where a size of each data block is equal to a size of the first granularity.

The first granularity is the deduplication granularity described above, that is, a granularity used when the storage device performs deduplication. In some embodiments, the storage device determines the first granularity based on a metadata management granularity. For example, the storage device determines a smallest value of the metadata management granularity, and uses an integer multiple of the smallest value of the metadata management granularity as the first granularity. In an embodiment, the smallest value of the metadata management granularity is used as the first granularity. For example, when the metadata management granularity is [4 KB, 1 M], if the storage device determines that the smallest value of the metadata management granularity is 4 KB, the storage device determines that the size of the first granularity is 4 KB, and divides the data into a plurality of 4 KB data blocks.

S320: The storage device determines a fingerprint of each of the plurality of data blocks.

In some embodiments, the storage device performs fingerprint calculation on each data block to obtain the fingerprint of each data block. In some embodiments, a fingerprint of a data block is a hash value of the data block, and the storage device performs hash calculation on each data block to obtain a hash value of each data block.

S330: The storage device determines a duplicate block and a non-duplicate block from the plurality of data blocks based on the fingerprint of each data block.

A fingerprint of a duplicate block is the same as a fingerprint of a data block already stored in the storage device. Data included in the duplicate block is completely the same as data included in the data block already stored in the storage device. Alternatively, data included in the duplicate block is the same as some data included in the data block already stored in the storage device and is different from some data included in the data block already stored in the storage device. If a fixed-length deduplication mode is used, the data included in the duplicate block is the same as the data included in the data block already stored in the storage device. If a similarity-based deduplication mode is used, data included in the duplicate block needs to be the same as only some data included the data block already stored in the storage device. The non-duplicate block is a data block other than the duplicate block in the plurality of data blocks. The non-duplicate block is also a data block that fails to be deduplicated.

In some embodiments, the storage device queries a fingerprint table, to determine whether a data block is a duplicate block or a non-duplicate block. In this implementation, operation S330 is also referred to as fingerprint query. The fingerprint table is used to store a fingerprint of a data block stored in the storage device. Specifically, a first data block in the plurality of data blocks is used as an example. In operation S330, the storage device queries the fingerprint table, and compares a fingerprint of the first data block with a fingerprint in the fingerprint table. If the fingerprint of the first data block is the same as the fingerprint in the fingerprint table (that is, the first data block hits the fingerprint table), the storage device determines that the first data block is a duplicate block. If the fingerprint of the first data block is different from all fingerprints in the fingerprint table (that is, the first data block misses the fingerprint table), the storage device determines that the first data block is a non-duplicate block.

In some embodiments, S330 is performed locally on the storage device. In some other embodiments, S330 is performed by the storage device and a dedicated server in collaboration. The dedicated server is an independent device coupled to the storage device or connected to the storage device through a network. The server stores a fingerprint table, and may be responsible for fingerprint query. In an embodiment, the storage device sends the fingerprint of each data block to the server according to a preset rule, and the server determines to query the fingerprint table based on the fingerprint of each data block, so that a fingerprint query task is offloaded to the server. This avoids a performance bottleneck of the storage device caused by a calculation amount of the fingerprint query.

An occasion for performing S330 includes a plurality of cases. In some embodiments, operation S330 is performed in real time after operation S320. In some other embodiments, after performing S320, the storage device determines whether a deduplication trigger condition is currently met, and if the deduplication trigger condition is met, the storage device performs operation S330. For example, when the deduplication trigger condition is that a load is lower than a threshold, after performing operation S320, the storage device determines whether the load is lower than the threshold. If the load is higher than the threshold, the storage device buffers the obtained fingerprint and waits. If the load is lower than the threshold, the storage device performs S330.

An operation performed by the storage device on a duplicate block is different from that on a non-duplicate block. In an embodiment, the storage device deduplicates the duplicate block, and compresses the non-duplicate block. The following uses S340 as an example to describe how the storage device performs a deduplication operation, and uses S350 and S360 as an example to describe how the storage device performs a compression operation.

It should be noted that this embodiment does not prescribe that both the deduplication operation and the compression operation are to be performed. In other embodiments, either the deduplication operation or the compression operation is performed. Specifically, inline deduplication includes a case in which the inline deduplication succeeds and a case in which the inline deduplication fails, and the case in which the inline deduplication fails is a case in which the storage device does not perform deduplication but performs compression. When the inline deduplication succeeds, if the storage device determines that all to-be-stored data blocks are duplicate blocks, the storage device performs S340, but does not perform S350 and S360. When the inline deduplication succeeds, if the storage device determines that some of the to-be-stored data blocks are duplicate blocks and the other data blocks are non-duplicate blocks, the storage device performs S340, S350, and S360. When the inline deduplication fails, the storage device performs S350 and S360, but does not perform S340.

Figure 4A:
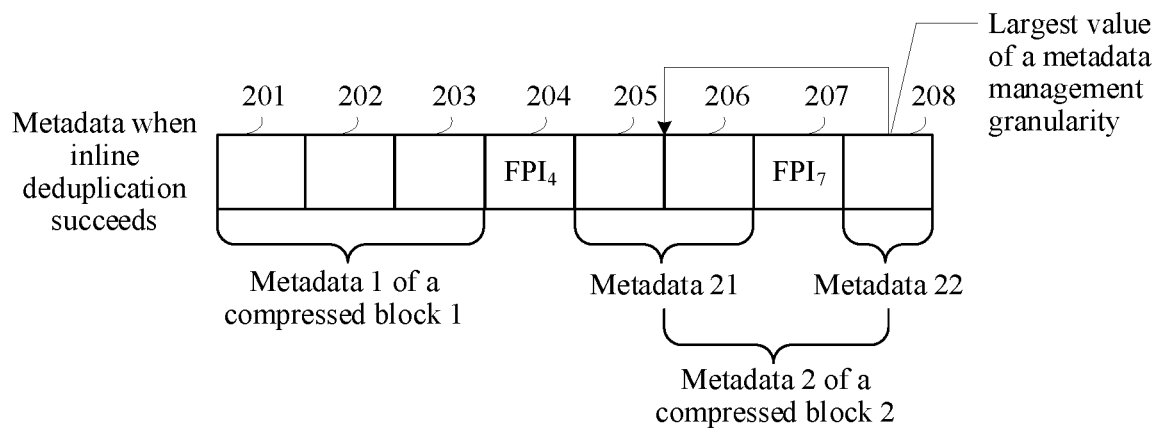
FIG. 4(a) and FIG. 4(b) are a schematic diagram of inline deduplication according to an embodiment of this application.
Figure 4B:
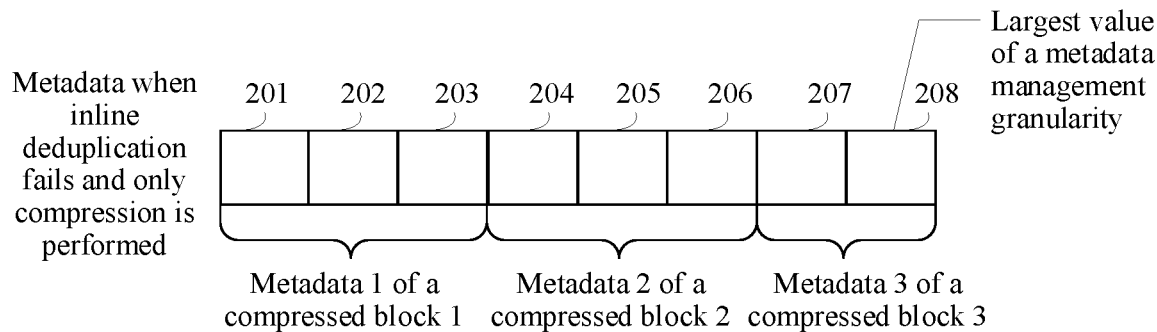

For example, FIG. 4(a) is an example of the case in which the inline deduplication succeeds. FIG. 4(b) is an example of the case in which the inline deduplication fails (compression without deduplication). In subsequent descriptions in this specification, procedures related to scenarios shown in FIG. 4(a) and FIG. 4(b) are described as examples.

In the scenario as shown in FIG. 4(a), a host initiates a write request for eight data blocks: a data block 1, a data block 2, . . . , a data block 8. After receiving the write request, the storage device separately performs fingerprint calculation on the eight data blocks to obtain eight fingerprints. The eight fingerprints are a fingerprint $FP_1$ of the data block 1, a fingerprint $FP_2$ of the data block 2, . . . , a fingerprint $FP_8$ of the data block 8. The storage device separately queries the fingerprint table based on the eight fingerprints, and finds that the fingerprint $FP_4$ and the fingerprint $FP_7$ hit the fingerprint table. That is, the storage device finds, in the fingerprint table, a fingerprint the same as the fingerprint $FP_4$ of the data block 4, and finds, in the fingerprint table, a fingerprint the same as the fingerprint $FP_7$ of the data block 7. Therefore, the storage device determines that both the data block 4 and the data block 7 are duplicate blocks. The storage device does not store the data block 4 and the data block 7, but records, in a storage unit 204, a fingerprint index $FPI_4$ corresponding to the fingerprint $FP_4$ of the data block 4, and records, in a storage unit 207, a fingerprint index $FPI_7$ corresponding to the fingerprint $FP_7$ of the data block 7. The storage device determines that data blocks other than the data block 4 and the data block 7 are non-duplicate blocks. The storage device compresses the data block 1, the data block 2, and the data block 3 to obtain a compressed block 1, and uses one piece of metadata to represent the compressed block 1 to obtain metadata 1 of the compressed block 1. The storage device stores the metadata 1 of the compressed block 1 in three physically consecutive and logically consecutive storage units: a storage unit 201, a storage unit 202, and a storage unit 203. The storage device compresses the data block 5, the data block 6, and the data block 8, to obtain a compressed block 2, and uses a piece of metadata 2 to represent the compressed block 2, to obtain the metadata 2 of the compressed block 2. The storage device stores the metadata 2 of the compressed block 2 in three physically consecutive but logically nonconsecutive storage units: a storage unit 205, a storage unit 206, and a storage unit 208. The metadata 2 includes two parts. One part is metadata 21, and the other part is metadata 22. The storage unit 205 and the storage unit 206 store the metadata 21, and the storage unit 208 stores the metadata 22. In addition, the storage device writes the compressed block 1 and the compressed block 2 to a hard disk.

In the scenario as shown in FIG. 4(b), a host initiates a write request for eight data blocks: a data block 1, a data block 2, . . . , a data block 8. After receiving the write request, the storage device performs fingerprint calculation on the eight data blocks to obtain eight fingerprints. The eight fingerprints are a fingerprint $FP_1$ of the data block 1, a fingerprint $FP_2$ of the data block 2, . . . , a fingerprint $FP_8$ of the data block 8. The storage device fails in deduplication due to a load higher than the threshold or other reasons. In this case, the storage device compresses the data block 1, the data block 2, and the data block 3 to obtain a compressed block 1, and uses one piece of metadata to represent the compressed block 1 to obtain metadata 1 of the compressed block 1. The storage device stores the metadata 1 of the compressed block 1 in three physically consecutive and logically consecutive storage units: a storage unit 201, a storage unit 202, and a storage unit 203. The storage device compresses the data block 4, the data block 5, and the data block 6 to obtain a compressed block 2, and uses one piece of metadata to represent the compressed block 2 to obtain metadata 2 of the compressed block 2. The storage device stores the metadata 2 of the compressed block 2 in three physically consecutive and logically consecutive storage units: a storage unit 204, a storage unit 205, and a storage unit 206. The storage device compresses the data block 7 and the data block 8 to obtain a compressed block 3, and uses one piece of metadata to represent the compressed block 3 to obtain metadata 3 of the compressed block 3. The storage device stores the metadata 3 of the compressed block 3 in two physically consecutive and logically consecutive storage units: a storage unit 207 and a storage unit 208. In addition, the storage device writes the compressed block 1, the compressed block 2, and the compressed block 3 to a hard disk.

S340: The storage device records metadata for the duplicate block.

The storage device records the metadata of the duplicate block but does not store the duplicate block, so that the duplicate block does not occupy storage space of the hard disk, to save storage resources of the storage device.

In some embodiments, the storage device further records metadata of the non-duplicate block, and stores the fingerprint of the non-duplicate block in the fingerprint table, so that when a new block is subsequently deduplicated, a previously stored fingerprint of a non-duplicate block can be found in the fingerprint table.

In some embodiments, the storage device stores the fingerprint of the duplicate block. In some embodiments, the storage device stores a fingerprint index of the duplicate block. Optionally, the metadata recorded by the storage device for the duplicate block is the fingerprint index (FPI) of the duplicate block. Specifically, the storage device uses the fingerprint index of the duplicate block as the metadata of the duplicate block, and writes the fingerprint index of the duplicate block to a metadata storage unit, to store the fingerprint index in the metadata storage unit. For example, as shown in FIG. 4(a), after determining that the data block 4 and the data block 7 are duplicate blocks, the storage device writes the fingerprint index $FPI_4$ of the data block 4 to the storage unit 204, and writes the fingerprint index $FPI_7$ of the data block 7 to the storage unit 207.

Referring to FIG. 4(a) and FIG. 4(b), a size of storage space occupied by the metadata of the duplicate block is equal to the size of the first granularity. For example, the size of the storage space occupied by the metadata of the duplicate block is equal to the smallest value of the metadata management granularity. For example, as shown in FIG. 4(a) and FIG. 4(b), the smallest value of the metadata management granularity corresponds to one grid in FIG. 4(a) and FIG. 4(b), and the smallest value of the metadata management granularity is, for example, a size of one storage unit. For example, the fingerprint index $FPI_4$ of the data block 4 occupies the storage unit 204, and a size of storage space occupied by the fingerprint index $FPI_4$ of the data block 4 is equal to a size of the storage unit 204.

In S340, there are a plurality of implementations for recording metadata by the storage device. In some embodiments, the storage device selects a first storage unit based on the metadata management granularity, and stores the metadata of the duplicate block in the first storage unit. A granularity of the first storage unit is the smallest value of the metadata management granularity. For example, if the metadata management granularity is [4 KB, 1 M], the storage device selects a storage unit whose size is 4 KB, and stores the metadata of the duplicate block in the 4 KB storage unit.

S350: The storage device compresses a plurality of non-duplicate blocks to obtain a compressed block.

The compressed block is a compressed non-duplicate block. In some embodiments, S350 includes operation a to operation c.

Operation a: The storage device obtains a compression ratio of the data.

There are a plurality of implementations for obtaining the compression ratio. In some embodiments, model training is performed based on a sample through machine learning, to obtain a prediction model. After the data is obtained, the data is input into the prediction model, and compression ratio prediction is performed on the data by using the prediction model, to output the compression ratio. In some other embodiments, the compression ratio is preset by a user based on experience. In some other embodiments, considering that there is a high probability that compression ratios of two consecutive data blocks are the same, a compression ratio of a previous data block is used as a compression ratio of current to-be-compressed data.

Operation b: The storage device groups the plurality of non-duplicate blocks into at least one data block group based on the predicted compression ratio, where a quantity of non-duplicate blocks included in each data block group is equal to the compression ratio.

For example, if the predicted compression ratio is 3:1, the storage device groups three non-duplicate blocks into one data block group, so that one data block group includes three non-duplicate blocks, and the three non-duplicate blocks are compressed together. If the predicted compression ratio is 4:1, the storage device groups four non-duplicate blocks into one data block group, so that one data block group includes four non-duplicate blocks, and the four non-duplicate blocks are compressed together. For example, as shown in FIG. 4(a) and FIG. 4(b), when the compression ratio is 3:1, three grids in FIG. 4(a) and FIG. 4(b) may correspond to one compressed block. For example, as shown in FIG. 4(a), the storage device groups the data block 1, the data block 2, and the data block 3 into one group, and groups the block 5, the block 6, and the block 8 into another group. For another example, as shown in FIG. 4(b), the storage device groups the data block 1, the data block 2, and the data block 3 into one group, groups the data block 4, the data block 5, and the data block 6 into another group, and groups the data block 7 and the data block 8 into one group.

In some embodiments, when grouping, the storage device considers not only the compression ratio, but also whether different non-duplicate blocks are consecutive. For example, the storage device groups a plurality of consecutive non-duplicate blocks into a same data block group based on the compression ratio and an address of each non-duplicate block. The "consecutive" includes but is not limited to at least one of "physically consecutive" or "logically consecutive". For example, whether non-duplicate blocks are physically consecutive is determined based on whether physical addresses are consecutive, and whether non-duplicate blocks are logically consecutive is determined based on whether logical addresses are consecutive.

Operation c: The storage device compresses each data block group into one compressed block.

For example, as shown in FIG. 4(a), the storage device compresses the data block 1, the data block 2, and the data block 3 into the compressed block 1, and compresses the data block 5, the data block 6, and the data block 8 into the compressed block 2. For another example, as shown in FIG. 4(b), the storage device compresses the data block 1, the data block 2, and the data block 3 into the compressed block 1, compresses the data block 4, the data block 5, and the data block 6 into the compressed block 2, and compresses the data block 7 and the data block 8 into the compressed block 3.

According to the foregoing compression procedure, because one compressed block is obtained by performing compression based on each non-duplicate block in one data block group, a second granularity is equal to a product of a quantity of non-duplicate blocks included in one data block group and a granularity of a non-duplicate block. Because the quantity of non-duplicate blocks included in one data block group is equal to the compression ratio, and the granularity of the non-duplicate block is equal to the smallest value of the metadata management granularity, the second granularity is equal to a product of the compression ratio and the smallest value of the metadata management granularity. For example, as shown in FIG. 4(a) and FIG. 4(b), the compression ratio is equal to 3:1, the metadata management granularity corresponds to one grid in FIG. 4(a) and FIG. 4(b), and the second granularity corresponds to three grids in FIG. 4(a) and FIG. 4(b). For example, the second granularity is equal to a sum of sizes of the storage unit 201, the storage unit 202, and the storage unit 203.

It can be learned that a compression granularity (namely, the second granularity) provided in this embodiment is no longer a fixed value the same as the deduplication granularity (that is, the first granularity), but is determined based on the smallest value of the metadata management granularity and the compression ratio. Therefore, a function of dynamically selecting the compression granularity is supported. Dynamic selection of the compression granularity helps ensure that the compression ratio is relatively good when data read performance does not deteriorate, to achieve a balance between a maximum compression ratio and read amplification. The following describes a technical principle for achieving such a technical effect with reference to a specific example.

For example, the smallest value of the metadata management granularity is 8 KB, the storage device obtains four 8 KB data blocks: a data block a, a data block b, a data block c, and a data block d. The storage device predicts that compression ratios of the four data blocks are all 4:1. Therefore, the storage device determines that a compression granularity is 32 KB, compresses 32 KB data of the data block a, the data block b, the data block c, and the data block d together to obtain an 8 KB compressed block e, and stores the compressed block e in a hard disk. Then, the storage device receives a read request, where the read request indicates the storage device to read the data block a. The storage device reads the 8 KB compressed block e from the hard disk in response to the read request. The storage device decompresses the compressed block e to obtain the data block a, the data block b, the data block c, and the data block d, and returns the data block a to an initiator of the read request. It can be learned from the example that a data granularity corresponding to the read request is 8 KB, and a data granularity (that is, a granularity of the compressed block e) actually read by the storage device from the hard disk is also 8 KB. It can be learned that the data granularity actually read from the hard disk is the same as the data granularity corresponding to the read request. Read amplification does not occur, and read performance degradation and bandwidth resource consumption caused by read amplification are avoided. In addition, the compression granularity is 32 KB and is relatively good, and this helps to achieve a relatively good compression ratio.

S360: The storage device stores the compressed block in the hard disk, and records metadata for the compressed block.

According to S360, the storage device stores data (the compressed block) obtained after deduplication and compression in the hard disk of the storage device.

The metadata of the compressed block represents, for example, a mapping relationship between a logical address of the data and a physical address of the compressed block.

In some embodiments, the storage device stores the metadata of the compressed block in a storage unit whose size falls within [smallest value of the metadata management granularity, compression granularity]. In this manner, a smallest value of a granularity of the metadata of the compressed block is the smallest value of the metadata management granularity, and a largest value of the granularity of the metadata of the compressed block is the compression granularity (the second granularity). In some embodiments, the granularity of the metadata of the compressed block is a product of the smallest value of the metadata management granularity and the compression ratio. For example, if the compression ratio is N:1, and the smallest value of the metadata management granularity is a size of one storage unit, the storage device selects N storage units, and stores the metadata of the compressed block in the N storage units. For example, as shown in FIG. 4(a) and FIG. 4(b), the compression ratio is 3:1, a smallest value of the metadata management granularity is a size of one storage unit, the storage device selects three storage units to record the metadata of the compressed block, and the granularity of the metadata of the compressed block is three times the size of the storage unit. For example, the storage device selects the storage unit 201, the storage unit 202, and the storage unit 203 to record the metadata 1 of the compressed block 1. A granularity of the metadata 1 of the compressed block 1 is a sum of sizes of the storage unit 201, the storage unit 202, and the storage unit 203.

A manner in which the storage device records the metadata includes at least one of a manner A and a manner B.

Manner A: The storage device records one piece of metadata for a plurality of compressed blocks with consecutive addresses.

Figure 7:
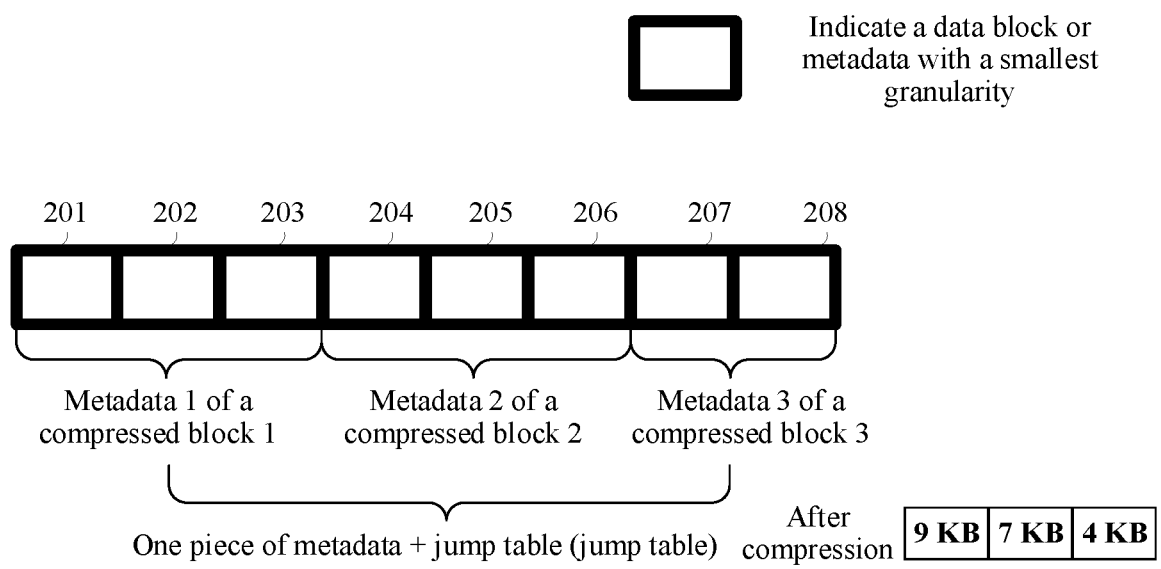
FIG. 7 is a schematic diagram of recording one piece of metadata for a plurality of compressed blocks according to an embodiment of this application.

In some embodiments, when addresses of a plurality of compressed blocks are consecutive, the storage device uses one piece of metadata to represent the plurality of compressed blocks. The addresses of the plurality of compressed block being consecutive means that, for example, physical addresses of the plurality of compressed block are consecutive and logical addresses of the plurality of compressed block are consecutive. In some embodiments, a piece of metadata recorded by the storage device includes two parts. One part is an address of the first compressed block in the plurality of compressed blocks with consecutive addresses, and the other part is a length of each of the plurality of compressed blocks with consecutive addresses. For example, as shown in FIG. 7, a small grid in FIG. 7 identifies a data block or metadata with a smallest granularity, for example, a 4 KB data block or 4 KB metadata. FIG. 7 is an illustration of how one piece of metadata is used to represent a compressed block 1, a compressed block 2, and a compressed block 3. As shown in FIG. 7, after the storage device performs compression to obtain three compressed blocks with consecutive addresses: the compressed block 1, the compressed block 2, and the compressed block 3, the storage device records one piece of metadata. The recorded metadata includes metadata 1 of the compressed block 1 (the first compressed block) and a jump table. The metadata 1 indicates an address of the compressed block 1. The jump table includes a length of the compressed block 1, a length of the compressed block 2, and a length of the compressed block 3. For example, if the length of the compressed block 1 is 9 KB, the length of the compressed block 2 is 7 KB, and the length of the compressed block 3 is 4 KB, the jump table includes 9 KB, 7 KB, and 4 KB.

The metadata is recorded in this manner, so that the data can be read by using the metadata, and further, a relatively good effect of compressing metadata space is achieved. The following uses an example to describe a technical principle for implementing this technical effect.

Because a length of each compressed block is recorded in the metadata, offset of each compressed block relative to the first compressed block can be indicated. For example, offset of the second compressed block relative to the first compressed block is a length of the first compressed block, and offset of the third compressed block relative to the first compressed block is a sum of lengths of the first compressed block and the second compressed block. Therefore, when the second compressed block is to be read, the second compressed block can be addressed in the hard disk based on an address of the first compressed block and the offset of the second compressed block relative to the first compressed block. When the third compressed block is to be read, the third compressed block can be addressed in the hard disk based on an address of the first compressed block and the offset of the third compressed block relative to the first compressed block. For example, in the scenario in FIG. 7, when the compressed block 2 is to be read, the storage device offsets backward by 9 KB from an address of the metadata 1 of the compressed block 1, so that the compressed block 2 can be found from the hard disk. When the compressed block 3 is to be read, the storage device offsets backward by 9 KB+7 KB=16 KB from the address of the metadata 1 of the compressed block 1, so that the compressed block 3 can be found from the hard disk. It can be learned that in this metadata recording manner, each compressed block can be located in the hard disk, and it is ensured that each compressed block can be read.

In addition, one piece of metadata is recorded for a plurality of compressed blocks with consecutive addresses, so that a quantity of pieces of recorded metadata is reduced, and storage resources occupied by the metadata in the storage device are reduced. For example, in the scenario in FIG. 7, the storage device records the metadata 1 of the compressed block 1, and does not need to be record the metadata 2 of the compressed block 2 and the metadata 3 of the compressed block 3. Therefore, storage space occupied by the metadata 2 of the compressed block 2 and the metadata 3 of the compressed block 3 is reduced.

Manner B: The storage device records a plurality of pieces of metadata for a plurality of compressed blocks with nonconsecutive addresses.

In some embodiments, when addresses of a plurality of compressed blocks are nonconsecutive, the storage device uses a plurality of pieces of metadata to represent the plurality of compressed blocks respectively. Optionally, similar to the manner A, one piece of metadata is recorded for two or more compressed blocks with consecutive addresses. A logical interval between a plurality of compressed blocks with nonconsecutive addresses, for example, corresponds to a fingerprint index of a duplicate block.

For example, as shown in FIG. 4(*a*), the compressed block 2 is obtained by compressing three non-duplicate blocks: the data block 5, the data block 6, and the data block 8. The data block 5 and the data block 6 are two logically adjacent blocks. The data block 6 and the data block 8 are logically separated. Specifically, a logical address of the data block 5 and a logical address of the data block 6 are consecutive, and the logical address of the data block 6 and a logical address of the data block 8 are not consecutive. For example, the logical address of the data block 5 is 205 and a length of the data block 5 is 8 KB, the logical address of the data block 6 is 206 and a length of the data block 6 is 8 KB, and the logical address of the data block 8 is 208, and a length of the data block 8 is 8 KB. However, there is the data block 7 logically between the data block 6 and the data block 8, and the data block 7 is found to be a duplicate block and is deduplicated, so that the storage unit 207 stores the fingerprint index $FPI_7$ of the data block 7. The storage device compresses the data block 5, the data block 6, and the data block 8 into the compressed block 2, and the metadata 2 recorded for the compressed block 2 includes two pieces of metadata: the metadata 21 and the metadata 22. The metadata 21 indicates that a start logical address is 205 and a length is 8 KB×2=16 KB. The metadata 22 indicates that a start logical address is 208 and a length is 8 KB.

In this example, one compressed block (the compressed block 2) corresponds to two pieces of metadata (the metadata 21 and the metadata 22). After the compressed block 2 is decompressed, the metadata 21 and the metadata 22 correspond to different parts of the decompressed data blocks. Specifically, the compressed block 2 is decompressed to obtain the data block 5, the data block 6, and the data block 8. The metadata 21 corresponds to the data block 5 and the data block 6, and the metadata 22 corresponds to the data block 8.

In the inline deduplication method provided in this embodiment, because the storage device performs deduplication and compression based on different granularities, a limitation that the deduplication granularity and the compression granularity need to be the same is removed. A deduplication ratio decrease caused by an excessively large granularity and a compression ratio decrease caused by an excessively small granularity are avoided to some extent, to improve an overall reduction ratio of deduplication and compression. Further, because both the deduplication granularity and the compression granularity are determined based on the metadata management granularity, deduplication and compression are separately performed based on relatively good granularities. This helps achieve a relatively good deduplication ratio and a relatively good compression ratio.

Figure 5:
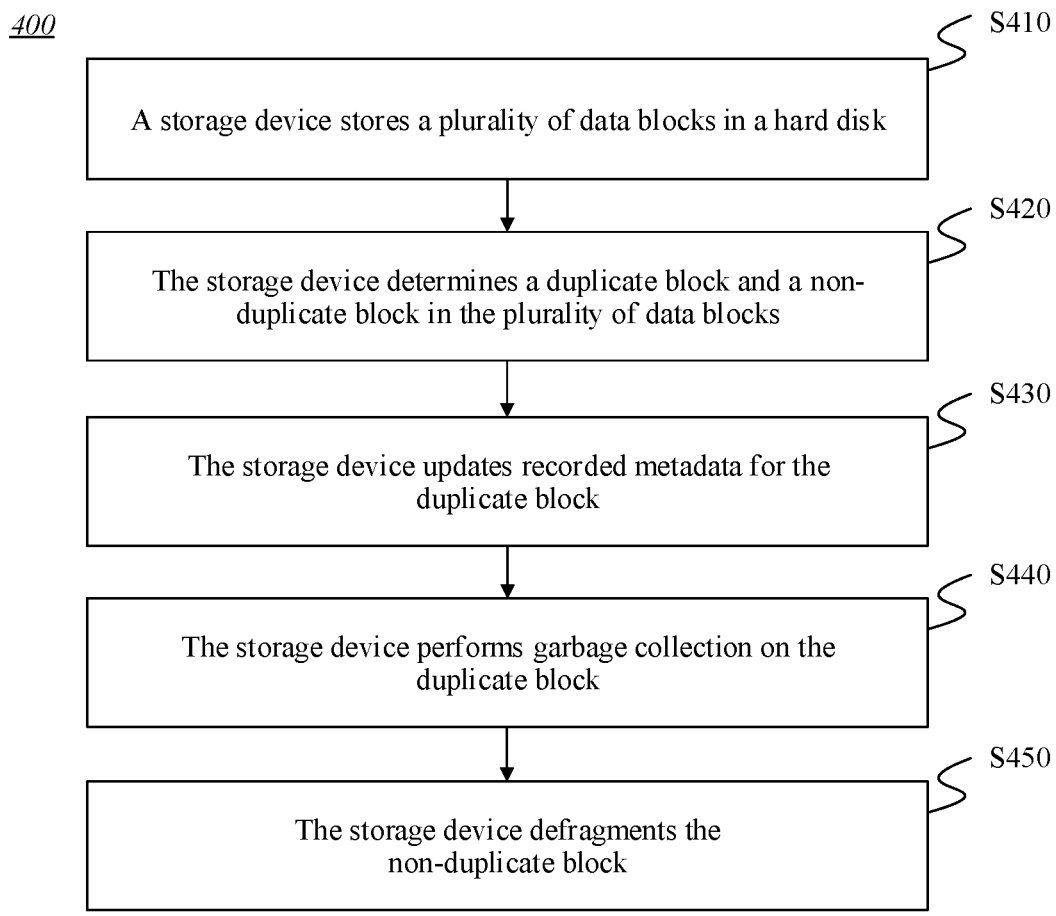
FIG. 5 is a flowchart of a data processing method according to an embodiment of this application.

FIG. 5 is a flowchart of a data processing method 400 according to an embodiment of this application.

For example, the method 400 includes S410 to S450.

S410: The storage device stores a plurality of data blocks in a hard disk.

In some embodiments, the storage device further calculates a fingerprint of each data block, and stores the fingerprint of the data block and a physical address of the data block in an opportunity table. The opportunity table is, for example, a form of a key-value pair. A key of the opportunity table is a fingerprint of a data block. A value of the opportunity table is a physical location of a data block. The opportunity table is used to find a fingerprint of a duplicate block.

In some embodiments, the storage device first compresses the plurality of data blocks to obtain a compressed block, and then stores the compressed block in the hard disk. A compression procedure is similar to the compression procedure described in the method 300. Specifically, during compression, the storage device predicts a data compression ratio, determines a second granularity based on the predicted compression ratio and a metadata management granularity, and performs compression based on the second granularity. For example, the storage device determines a product of a smallest value of the metadata management granularity and the compression ratio as the second granularity.

S420: The storage device determines a duplicate block and a non-duplicate block in the plurality of data blocks.

For example, the storage device reads the fingerprint of each data block from the opportunity table, and compares the fingerprint of the data block with a fingerprint already recorded in a fingerprint table. If the fingerprint of the data block is the same as the fingerprint already recorded in the fingerprint table, the storage device determines that the data block is a duplicate block. If the fingerprint of the data block is different from all fingerprints recorded in the fingerprint table, the storage device determines that the data block is a non-duplicate block, and records the fingerprint of the data block in the fingerprint table.

S430: The storage device updates recorded metadata for the duplicate block.

After finding the duplicate block that can be deduplicated, the storage device updates the metadata of the duplicate block. In some embodiments, the storage device updates the metadata of the duplicate block to a fingerprint of the duplicate block. For example, the storage device determines a second storage unit, the second storage unit is used to store the metadata of the duplicate block, and a granularity of the second storage unit is the smallest value of the metadata management granularity. The storage device writes the fingerprint of the duplicate block to the second storage unit, so that the metadata stored in the second storage unit is changed, through overwriting, from the previously recorded metadata to the fingerprint of the duplicate block.

Figure 6A:
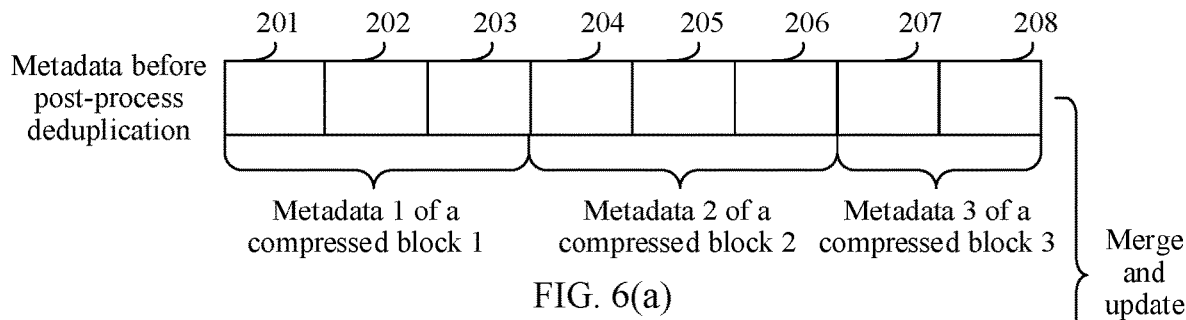
FIG. 6(a) to FIG. 6(d) is a schematic diagram of post-process deduplication according to an embodiment of this application.
Figure 6B:
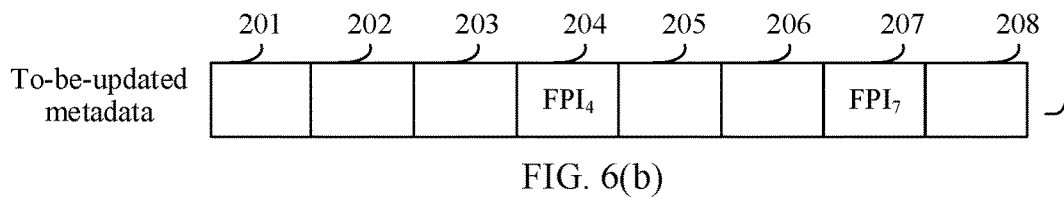
Figure 6C:
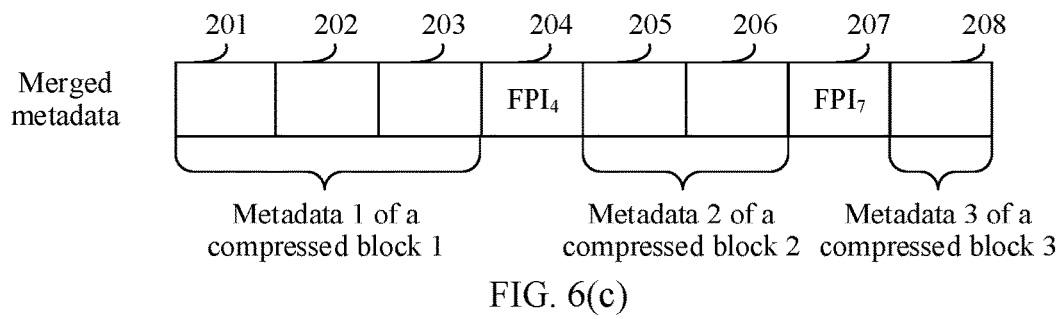
Figure 6D:
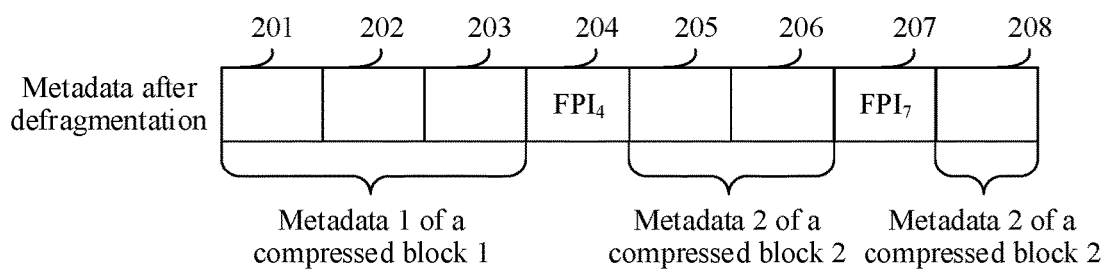

For example, as shown in FIG. 6(a) to FIG. 6(d), after storing a data block 1, a data block 2, . . . , a data block 8 in the hard disk, the storage device determines that both the data block 4 and the data block 7 are duplicate blocks, and updates metadata of the data block 4 and metadata of the data block 7. Specifically, the storage device uses a fingerprint index $FPI_4$ of the data block 4 as metadata of the data block 4, and overwrites the fingerprint index $FPI_4$ of the data block 4 on a storage unit 204, so that data stored in the storage unit 204 is updated from metadata of the data block 4 to the fingerprint index $FPI_4$. In addition, the storage device uses a fingerprint index $FPI_7$ of the data block 7 as metadata of the data block 7, and overwrites the fingerprint index $FPI_7$ of the data block 7 on a storage unit 207, so that data stored in the storage unit 207 is updated from metadata of the data block 7 to the fingerprint index $FPI_7$. FIG. 6(a) shows an example of metadata before post-process deduplication, FIG. 6(b) shows an example of to-be-updated metadata, FIG. 6(c) shows an example of merged metadata, and FIG. 6(d) shows an example of defragmented metadata.

S440: The storage device performs garbage collection on the duplicate block.

After the metadata is updated for the duplicate block, the duplicate block may be referred to as junk data. The storage device deletes the duplicate block, to release storage space occupied by the duplicate block. For example, as shown in FIG. 6(a) to FIG. 6(d), after updating the metadata stored in the storage unit 204 to the fingerprint index $FPI_4$ of the data block 4, and updating the metadata stored in the storage unit 207 to the fingerprint index $FPI_7$ of the data block 7, the storage device deletes the data block 4 and the data block 7. In some embodiments, the storage device reads both the duplicate block and the non-duplicate block from the hard disk, erases storage units originally occupied by the duplicate block and the non-duplicate block in the hard disk, and then rewrites the non-duplicate block to the hard disk, to perform garbage collection.

The duplicate block includes a compressed block and a common data block. Therefore, in a garbage collection process, a compressed block may be overwritten, or a common data block may be overwritten. For the common data block, the storage device only moves valid data out. For the compressed block, the storage device first decompresses the compressed block with a variable-length granularity, and then re-compresses valid data in decompressed data. Because a granularity of the compressed block decreases, a compression ratio decreases in this case. The storage device performs the following S450 to perform a defragmentation procedure, so as to implement largest-granularity compression.

S450: The storage device defragments the non-duplicate block.

According to S450, the storage device stores data (the non-duplicate block obtained after defragmentation) obtained after deduplication and compression in the hard disk of the storage device.

In an embodiment, in the defragmentation process, if to-be-defragmented data is a duplicate block, the storage device retains a fingerprint index of the duplicate block. The to-be-defragmented data includes, for example, data that is not compressed based on the second granularity. If the to-be-defragmented data is compressed blocks, the storage device determines whether a compression granularity (that is, the second granularity) corresponding to the compressed blocks is less than a relatively good compression granularity (for example, the product of the smallest value of the metadata management granularity and the compression ratio). If the compression granularity (that is, the second granularity) corresponding to the compressed blocks is less than the relatively good compression granularity, the plurality of compressed blocks are re-compressed based on the relatively good compression granularity, to improve the compression ratio. For example, the storage device first decompresses the compressed blocks to obtain non-duplicate blocks, and then the storage device determines a compression granularity based on the smallest value of the metadata management granularity and the compression ratio in a manner similar to that in operation S350. The storage device groups the plurality of non-duplicate blocks into at least one data block group, and compresses each data block group into one compressed block, to implement re-compression.

For example, the compression ratio is 3:1, the smallest value of the metadata management granularity is equal to a size of one storage unit, and the relatively good compression granularity is equal to a sum of sizes of three storage units. Refer to FIG. 6(c). In the defragmentation process, the storage device determines that a compression granularity corresponding to a compressed block 2 is a size of two storage units, and determines that a compression granularity corresponding to a compressed block 3 is a size of one storage unit. If both the compression granularities corresponding to the compressed block 2 and the compressed block 3 are less than the relatively good compression granularity, the storage device decompresses the compressed block 2 to obtain the data block 5 and the data block 6, and decompresses the compressed block 3 to obtain the data block 8. The storage device re-compresses the data block 5, the data block 6, and the data block 8 to obtain a new compressed block 2, and writes the new compressed block 2 to the hard disk. In this example, a compression granularity corresponding to the new compressed block 2 is a size of three storage units, and is better than the compression granularity corresponding to the compressed block 2 and the compression granularity corresponding to the compressed block 3. This helps improve the compression ratio.

In the post-process deduplication method provided in this embodiment, because the storage device performs deduplication and compression based on different granularities, a limitation that the first granularity and the second granularity need to be the same is removed. A deduplication ratio decrease caused by an excessively large granularity and a compression ratio decrease caused by an excessively small granularity are avoided to some extent, to improve an overall reduction ratio of deduplication and compression. Further, because both the first granularity and the second granularity are determined based on the metadata management granularity, deduplication and compression are separately performed based on relatively good granularities. This helps achieve a relatively good deduplication ratio and a relatively good compression ratio.

The foregoing describes the method 300 and the method 400 in the embodiments of this application. The following describes the storage device in the embodiments of this application from a perspective of logical functions.

Figure 8:
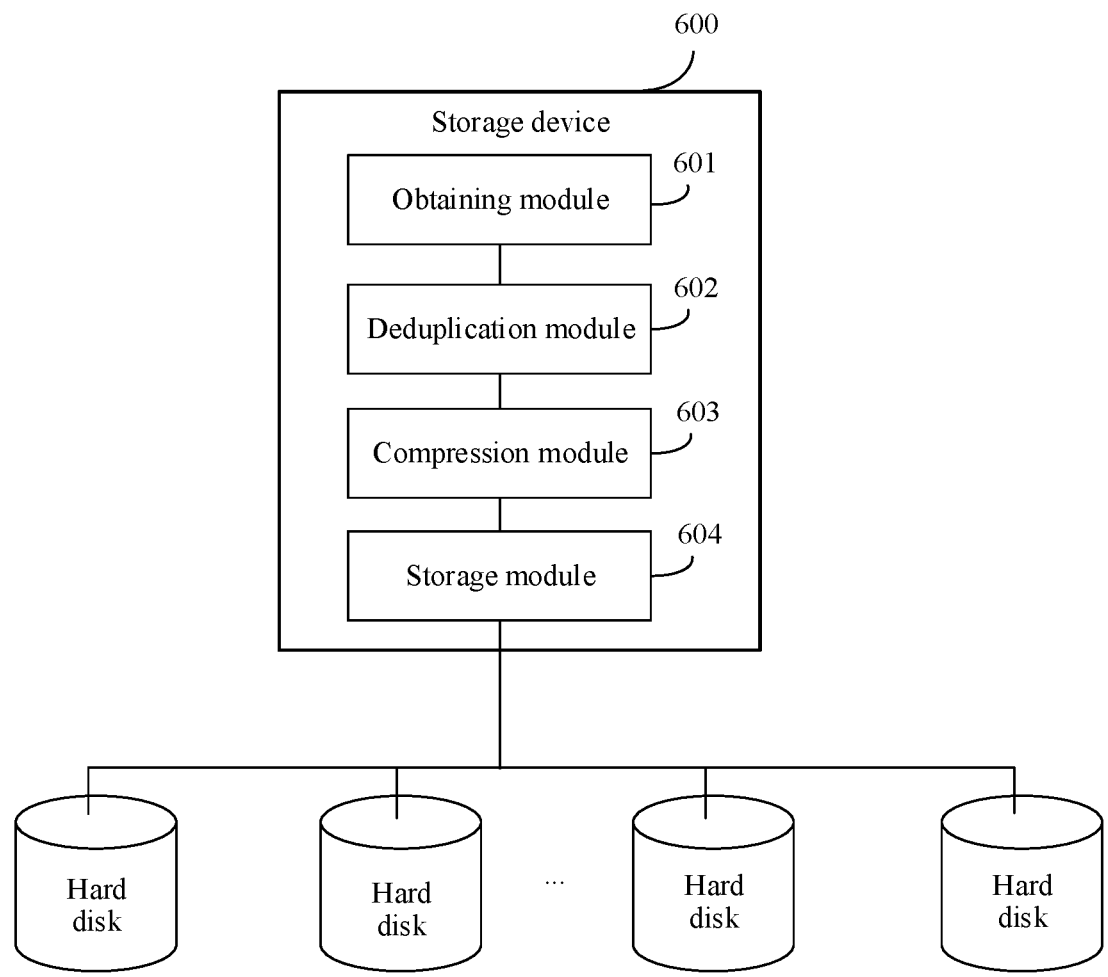
FIG. 8 is a schematic diagram of a structure of a storage device according to an embodiment of this application.

FIG. 8 is a possible schematic diagram of a structure of a storage device in the foregoing embodiments. A storage device 600 shown in FIG. 8 implements, for example, a function of the storage device in the method 300 or the method 400. The storage device 600 includes an obtaining module 601, a deduplication module 602, a compression module 603, and a storage module 604.

The obtaining module 601 is configured to obtain data. The deduplication module 602 is configured to deduplicate the data based on a first granularity. The compression module 603 is configured to compress the data based on a second granularity, where a size of the second granularity is greater than a size of the first granularity. The storage module 604 is configured to store data obtained after the deduplication and the compression in a hard disk of the storage device.

In some embodiments, the storage device further includes a recording module, configured to record metadata of a compressed block.

In this embodiment, division into the modules is an example, and is merely logical function division and may be optionally other division in an actual implementation.

In some embodiments, at least one module in the storage device 600 is integrated into one processor, a same chip, or a same board. For example, the obtaining module 601, the deduplication module 602, and the compression module 603 are all integrated in a same processor, and the processor implements functions of the obtaining module 601, the deduplication module 602, and the compression module 603.

In some other embodiments, different modules of the storage device 600 are implemented by using different processors or other different hardware. For example, the obtaining module 601 is implemented by using the network adapter 1011 shown in FIG. 1, the functions of the deduplication module 602 and the compression module 603 each are implemented by using a different dedicated processor, and the function of the storage module 604 is implemented by using a central processing unit.

A person of ordinary skill in the art may be aware that, in combination with the examples described in the embodiments disclosed in this specification, method operations and modules can be implemented by electronic hardware, computer software, or a combination thereof. To clearly describe the interchangeability between the hardware and the software, the foregoing has generally described operations and composition of each embodiment based on functions. Whether the functions are performed by hardware or software depends on particular applications and design constraint conditions of the technical solutions. The person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, reference can be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the modules is merely logical function division and may be other division in actual implementation. For example, a plurality of modules or components may be combined or integrated into another system, or some features may be ignored or may not be performed. In addition, the displayed or discussed mutual couplings or direct couplings or communication connections may be implemented through some interfaces, indirect couplings or communication connections between the apparatuses or modules, or electrical connections, mechanical connections, or connections in other forms.

The modules described as separate parts may or may not be physically separate, and parts displayed as modules may or may not be physical modules, may be located in one position, or may be distributed on a plurality of network modules. Some or all of the units may be selected based on actual requirements to achieve the objectives of the solutions of the embodiments in this application.

In addition, modules in the embodiments of this application may be integrated into one processing module, or each of the modules may exist alone physically, or two or more modules may be integrated into one module. The integrated module may be implemented in a form of hardware, or may be implemented in a form of a software module.

When the integrated module is implemented in the form of a software function module and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, or a network device) to perform all or some of the operations of the method described in the embodiments of this application. The foregoing storage medium includes any medium that can store program code, such as a USB flash drive, a removable hard disk, a read-only memory (ROM), a random access memory (RAM), a magnetic disk, or an optical disc.

In the embodiments of this application, terms such as "first" and "second" are used to distinguish same items or similar items that have basically same functions. It should be understood that there is no logical or time sequence dependency between "first" and "second", and a quantity and an execution sequence are not limited. It should also be understood that although terms such as "first" and "second" are used in the following description to describe various elements, these elements should not be limited by the terms. These terms are merely used to distinguish one element from another element. For example, without departing from the scope of the various examples, the first granularity may be referred to as the second granularity, and similarly, the second granularity may be referred to as the first granularity. Both the first granularity and the second granularity may be granularities, and may be separate and different granularities in some cases.

The term "at least one" in this application means one or more, and the term "a plurality of" in this application means two or more. For example, "a plurality of compressed blocks" means two or more compressed blocks. The terms "system" and "network" may be used interchangeably in this specification.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement the embodiments, all or some of the embodiments may be implemented in a form of a computer program product. The computer program product includes one or more computer program instructions. When the computer program instructions are loaded and executed on the computer, the procedure or functions according to the embodiments of this application are all or partially generated. The computer may be a general-purpose computer, a dedicated computer, a computer network, or other programmable apparatuses.

The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof without departing from the scope of the technical solutions of the embodiments of this application.

What is claimed is:

1. A method for processing data performed by a storage device, the method comprising:
    obtaining data;
    deduplicating the data based on a first granularity;
    compressing the deduplicated data based on a second granularity, wherein a size of the second granularity is greater than a size of the first granularity; and
    storing data obtained after the deduplication and the compression in a hard disk of the storage device; wherein the storage device stores metadata managed based on a metadata management granularity, a size of the metadata management granularity is less than or equal to a specified largest value and is greater than or equal to a specified smallest value, and the size of the first granularity is equal to an integer multiple of the smallest value.

2. The method according to claim 1, wherein the size of the second granularity is a product of the smallest value and a compression ratio.

3. The method according to claim 1, wherein the deduplicating the data based on the first granularity comprises:
    dividing the data into a plurality of data blocks;
    obtaining a fingerprint of each data block; and
    determining a duplicate block and a non-duplicate block from the plurality of data blocks based on the fingerprints.

4. The method according to claim 3, wherein the compressing the data based on the second granularity comprises:
    compressing the non-duplicate block based on the second granularity to obtain a compressed block, wherein the data obtained after the deduplication and the compression comprises the compressed block.

5. The method according to claim 4, further comprising recording metadata of the compressed block.

6. The method according to claim 5, wherein the recording metadata of the compressed block comprises:
    if there are a plurality of compressed blocks and addresses of the plurality of compressed blocks are consecutive, recording one piece of metadata for the plurality of compressed blocks.

7. The method according to claim 6, wherein the piece of metadata comprises an address of a first compressed block in the plurality of compressed blocks and a length of each compressed block.

8. The method according to claim 1, wherein the data is further compressed based on a third granularity before the deduplication and the compression, and a size of the third granularity is less than the size of the second granularity.

9. The method according to claim 1, wherein the storage device is a part of a storage array.

10. The method according to claim 1, wherein the storage device is a storage node in a distributed storage system.

11. A storage device, comprising:
    a hard disk; and
    at least one processor configured to
        obtain data,
        deduplicate the data based on a first granularity,
        compress the deduplicated data based on a second granularity, wherein a size of the second granularity is greater than a size of the first granularity, and
        store data obtained after the deduplication and the compression in the hard disk; wherein the storage device stores metadata managed based on a metadata management granularity, a size of the metadata management granularity is less than or equal to a specified largest value and is greater than or equal to a specified smallest value, and the size of the first granularity is equal to an integer multiple of the smallest value.

12. The storage device according to claim 11, wherein the size of the second granularity is a product of the smallest value and a compression ratio.

13. The storage device according to claim 11, wherein the at least one processor is configured to:
divide the data into a plurality of data blocks,
obtain a fingerprint of each data block, and
determine a duplicate block and a non-duplicate block from the plurality of data blocks based on the fingerprints.

14. The storage device according to claim 13, wherein the at least one processor is configured to compress the non-duplicate block based on the second granularity to obtain a compressed block, wherein the data obtained after the deduplication and the compression comprises the compressed block.

15. The storage device according to claim 14, wherein the at least one processor is further configured to record metadata of the compressed block.

16. The storage device according to claim 15, wherein the at least one processor is configured to: if there are a plurality of compressed blocks and addresses of the plurality of compressed blocks are consecutive, record one piece of metadata for the plurality of compressed blocks.

17. The storage device according to claim 16, wherein the piece of metadata comprises an address of the first compressed block in the plurality of compressed blocks and a length of each compressed block.

18. A non-transitory computer-readable medium having instructions stored therein, which when executed by a processor, cause the processor to perform operations of processing data, the operations comprising:
obtaining data;
deduplicating the data based on a first granularity;
compressing the deduplicated data based on a second granularity, wherein a size of the second granularity is greater than a size of the first granularity; and
storing data obtained after the deduplication and the compression in a hard disk of a storage device; wherein the processor stores metadata managed based on a metadata management granularity, a size of the metadata management granularity is less than or equal to a specified largest value and is greater than or equal to a specified smallest value, and the size of the first granularity is equal to an integer multiple of the smallest value.

* * * * *